May 21, 1968
E. T. ABLE
3,384,747
LIGHTNING WARNING PROBE UTILIZING A RADIOACTIVE
IONIZING ELEMENT
Filed Sept. 8, 1964
2 Sheets-Sheet 1
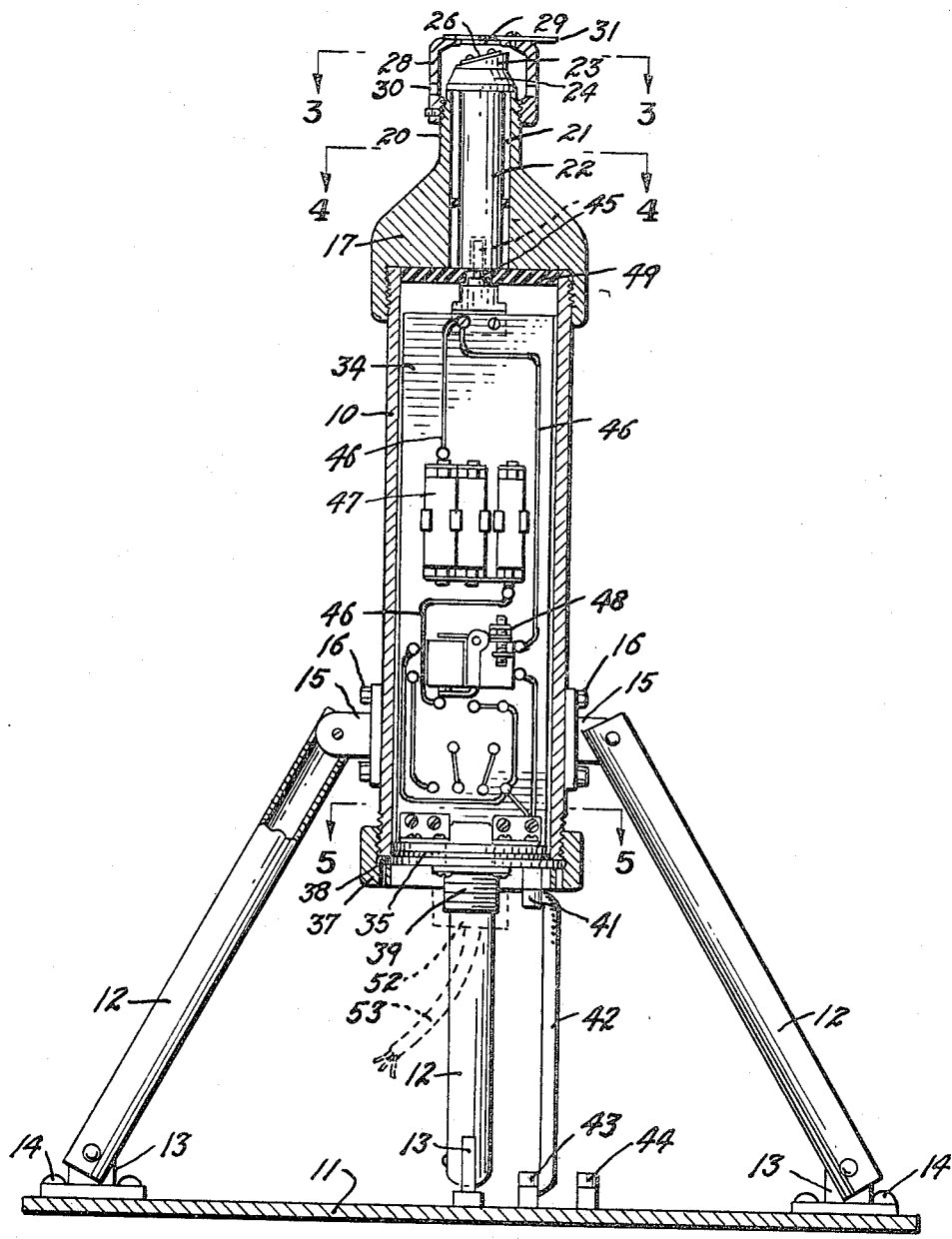
Fig_2
INVENTOR.
EDWARD T. ABLE
BY
ATTORNEY

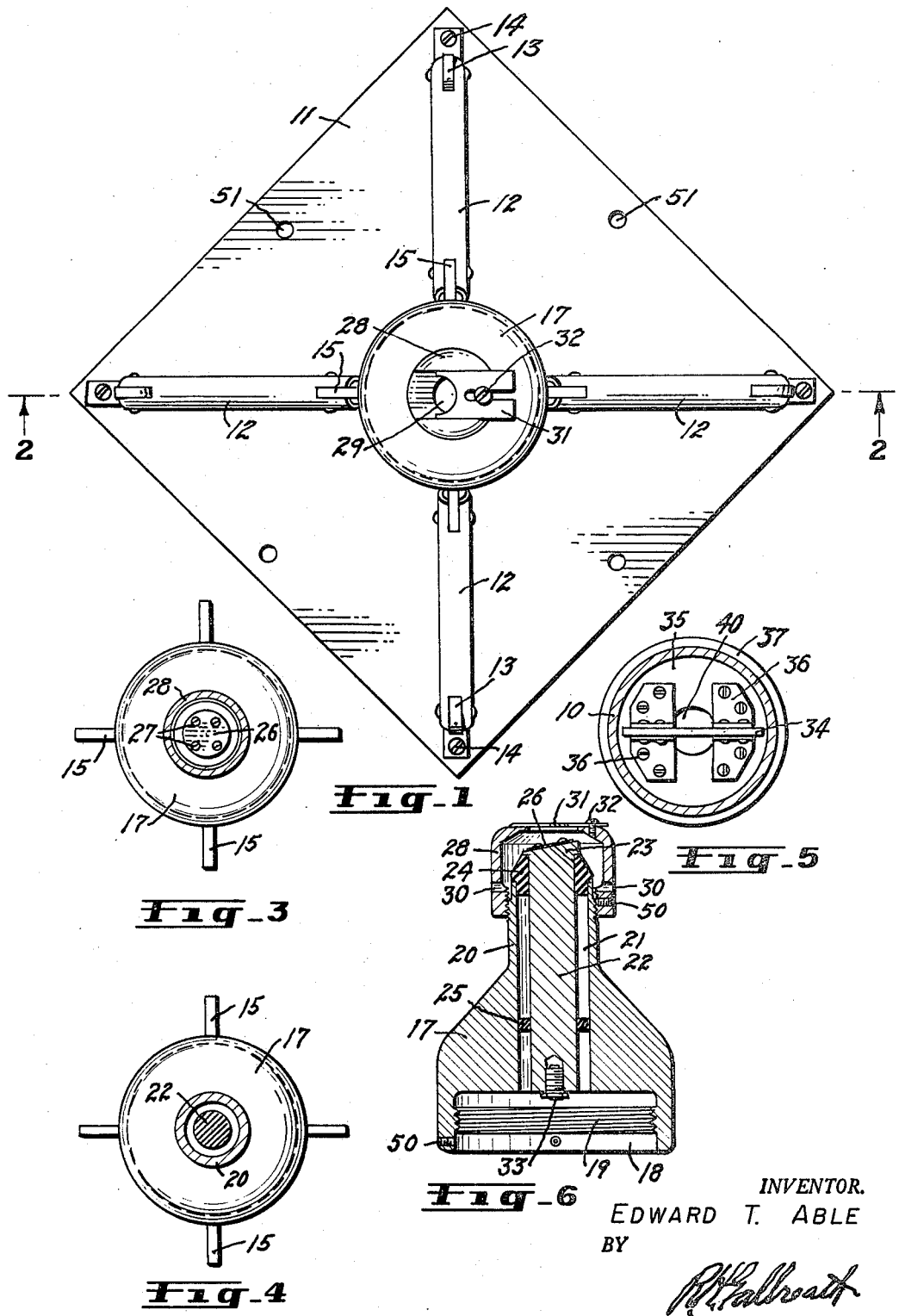

United States Patent Office 3,384,747
Patented May 21, 1968

3,384,747
LIGHTNING WARNING PROBE UTILIZING A
RADIOACTIVE IONIZING ELEMENT
Edward T. Able, Denver, Colo., assignor to B. K.
Sweeney Manufacturing Co., Denver, Colo.
Filed Sept. 8, 1964, Ser. No. 394,880
8 Claims. (Cl. 250—44)

This invention relates to a lightning warning system for detecting the possibility of atmospheric lightning and has for its principal object the provision of a highly efficient probe for continuously monitoring the atmospheric voltage gradient so as to detect atmospheric conditions that could produce lightning in the vicinity of missile bases, fueling stations, explosive handling equipment and other hazardous areas and to furnish a signal to be used to actuate a warning device to give notice of the possibility of the occurrence of lightning so that steps may be taken in advance to avoid damage and injury should lightning occur.

Since it is impossible to have a lightning stroke to the earth without first having a rise in the electrical potential gradient in the atmosphere, another object of this invention is to provide an exceedingly sensitive and highly insulated sensing element or probe which, through a radio-active beta emitter (H3) continuously assumes and transmits the potential of the surrounding atmosphere to suitable signal control equipment to cause the latter to indicate when atmospheric conditions are favorable for the production of lightning.

This invention relates more particularly to the probe, per se. The potential delivered by the probe can be used to actuate any suitable electrostatic DC amplifier for producing an atmospheric potential indication and for producing an alarm, either visual or audible, when the potential gradient reaches a predetermined level.

Other objects and advantages reside in the detail construction of the invention, which is designed for simplicity, economy, and efficiency. These will become more apparent from the following detailed description of the invention.

In the following detailed description of the invention, reference is made to the accompanying drawing which forms a part hereof. Like numerals refer to like parts in all views of the drawing and throughout the description.

In the drawing:
FIG. 1 is a top plan view of the lightning warning probe of this invention;
FIG. 2 is a vertical longitudinal section through the probe of FIG. 1, taken on the line 2—2, FIG. 1;
FIGS. 3, 4, and 5 are detail cross-sections looking downwardly on the lines 3—3, 4—4, and 5—5, respectively in FIG. 2, with the supporting structure eliminated; and
FIG. 6 is a slightly enlarged, vertical, axial, detail section through a sensing head employed on the probe.

Broadly, the probe comprises a tubular instrument housing provided with means for supporting the housing in a vertical position and provided with an atmospheric sensing head at its upper extremity.

As illustrated, the housing comprises a cylindrical, aluminum container 10 provided with threads at both its extremities. The container 10 is vertically supported above a metallic base plate 11 by means of tubular diagonal braces 12 extending from lower bracket members 13 mounted, in uniformly-spaced relation, on the base plate 11 through the medium of suitable cap screws 14. The upper extremities of the tubular diagonal braces are mounted, in upper bracket members 15, secured to the container 10 in uniformly spaced relation by means of cap screws 16.

The atmospheric sensing head comprises a metallic head element 17 having a relatively large lower extremity provided with a socket 18 containing internal threads 19 which are threaded on the upper extremity of the container 10. The upper extremity of the head element 17 is reduced in diameter to form a threaded, concentric neck portion 20. An axially-positioned, vertical passage 21 extends through the head element 17 and its neck portion 20 in which a vertical, metallic, circuit bar 22, of less diameter than the passage, is positioned. The circuit bar is provided with an enlarged head 23 at its upper extremity and has a conventional phone tip jack 33 inserted in its lower extremity. The enlarged head 23 is supported from the neck portion 20 by means of an annular, conical supporting insulator 24, of plexiglass or similar high electrical insulation. The supporting insulator snugly surrounds the circuit bar 22 and fits within, and rests upon, the upper extremity of the neck portion 20 beneath the head 23 of the circuit bar 22 to support and maintain the latter concentric of the passage 21. The lower extremity of the circuit bar 22 is maintained concentric of the passage 21 by a plexiglass ring 25 snugly fitted and cemented into the passage 21 around the bar 22. After insertion of the circuit bar 22, it is preferred to fill the intervening space in the passage 21 with suitable insulating epoxy, such as "Scotch Cast #5," to provide permanent insulation.

The upper surface of the enlarged head 23 is preferably, but not necessarily, inclined and is covered with a flat, radio-active leaf 26 of tritium (tritiated titanium foil) or other radio-active isotope, held in place on the surface by means of clamp screws 27.

An inverted-cup-shaped metallic cap 28 is threaded upon the upper extremity of the neck 20 so as to cover and surround the leaf 26 in spaced relation to the latter, as shown in FIG. 6, to form an ionization chamber therearound. The cap is provided with a window 29 positioned directly over the leaf 26 and with drain openings 30 in the cap walls. Moisture entering the window 29 will drain from the leaf 26 due to the incline thereof and will drain from the cap through the drain holes or openings 30. The drain holes also provide air circulation through the cap so that the air therein is a true sample of the air thereabout.

The open area of the window can be regulated and preset by means of a slider 31 inset in the top of the cap 28 which can be set in any preadjusted position over the window by means of a binding screws 32.

A vertically elongated, flat, insulated, instrument panel 34 is positioned longitudinally and diametrically within the container 10. The panel 34 is mounted upon a metallic supporting disc 35 by means of suitable angle clips 36. The supporting disc has an upper diameter to fit snugly within the lower extremity of the container 10 and a relatively larger lower diameter which overlaps and is clamped and grounded against the lower extremity of the container by an internally flanged retaining ring 37 which is threaded onto the lower extremity of the container. An O-ring 38 surrounds the supporting disc 35 between the two diameters thereof to seal the disc to the container when in place. A connecting nipple 39 is mounted on the lower surface of the disc 35 about a central wiring opening 40 therein to connect a conductor conduit or other desired equipment to the probe. A first ground binding post 41 is mounted on and in electrical contact with the disc and projects downwardly therefrom. The binding post 41 is connected by means of a ground strap 42 to a second binding post 43 mounted on and grounded to the base plate 11. A third binding post 44 is mounted and grounded to the base plate 11 for connection to a suitable earth ground. A circuit connecting plug 45 is mounted at the middle of the upper extremity of the instrument panel 34 which, when the panel is positioned in the container 10, enters and makes contact with the jack 33 in the circuit bar 22.

The probe circuit is imprinted on the panel 34 as indicated at 46 and may comprise any conventional electrostatic, DC, amplifier circuit. The various circuit equipment such as, for instance, the bias batteries 47, the relay 48, etc. are mounted on one or both sides of the panel 34. The circuit is such as will amplify at atmospheric voltage gradient between the radio-active tritium leaf 26, which acts as an ionizer in the cap 28, and the ground.

The electrostatic or high resistance characteristic of the improved probe enables it to measure electric potential at the high level of atmospheric resistance and the ionizer provides electric charges to quickly couple the ionizer or radio-active leaf 26 of the probe to reflect changes in the adjacent atmospheric electrical field. In turn, the atmospheric potential gradient is a function of static charge build-up on the clouds in the test area. The leaf 26 ionizes the air in the cap 28. Under the influence of the electric field gradient, the charged ions are accelerated and result in a current flow, which reflects the varying atmospheric gradient, and which is amplified by the circuit and equipment on the panel 34 and furnished to any desired electrostatic amplifier and warning equipment.

The instrument panel 34 can be quickly and easily withdrawn for replacement and repairs and quickly reinserted in connected position in the container 10. A plexiglass insulating disc 49 is inserted in the upper extremity of the container 10 through which the plug 45 protrudes. The disc 49 prevents accidental contacts with the circuitry.

The position of a cable connector and conducting cable have been indicated in broken line at 52 and 53, respectively, in FIG. 2. Openings 51 are provided in the base plate 11 for anchoring the probe in a proper receptive position. The various threaded connections in the device are preferably provided with suitable set screws 50 for locking the connections in their proper preset positions.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A probe construction for use in sensing the gradient of electrical potential in the atmosphere comprising: a hollow, vertical, electrically grounded, metallic container; a metallic head element closing the top of and grounded to said container; an ungrounded metallic circuit bar positioned in a vertical passage through said head element, said bar being spaced from and electrically insulated in its entirety from said container and from said head element; a radio-active, ionizing element mounted on the upper extremity of said circuit bar above said head element; and an electrostatic DC amplifier circuit completely enclosed in said container and connected to said circuit bar for amplifying the potential produced by said ionizing element in consequence of its contact with the atmosphere.

2. A probe construction as recited in claim 1 having a metallic, inverted-cup-shaped cap threaded upon and grounded to the upper extremity of said head element covering and surrounding said ionizing element in spaced relation thereto to form an ionizing chamber there around, said cap being provided with a window opening which provides atmospheric access to said chamber.

3. A probe construction as recited in claim 2 having a slider positioned in said cap for varying the cross-section of said window opening for calibrating said probe to atmospheric conditions.

4. A probe construction as recited in claim 2 having a metallic base plate positioned directly below said container; diagonal braces extending from said base plate to said container and supporting the latter in a vertical position above said plate; and an electric conductor grounding said container to said base plate.

5. A probe construction as described in claim 2 having an elongated, vertical, electrically insulated instrument panel carrying said electrostatic amplifier circuit, said panel being positioned diametrically within said container; means at the upper extremity of said panel detachably and electrically connecting said amplifying circuit to said circuit bar; and circuit grounding means at the lower extremity of said panel acting to ground said circuit to said container.

6. A probe construction as described in claim 5 in which the circuit grounding means comprises: a metallic supporting disc closing the lower extremity of said container; a retaining ring threaded on the container and acting to force said disc into electrically grounded relation with said container; and a ground conductor extending from said disc.

7. A probe construction as described in claim 6 in which the upper extremity of said circuit bar and said radio-active ionizing element are inclined from the horizontal so as to shed water to drain openings formed in the lower portion of said cap.

8. A probe construction as described in claim 3 in which the radioactive ionizing element comprises a leaf of tritiated titanium foil.

References Cited

UNITED STATES PATENTS 1,605,295 11/1926 Shrader _____ 250—44 X
2,025,338 12/1935 Capart _____ 250—106 X ARCHIE R. BORCHELT, *Primary Examiner.*